United States Patent [19]

Tuithof et al.

[11] 4,174,479

[45] Nov. 13, 1979

[54] MASS SPECTROMETER

[76] Inventors: Hans H. Tuithof, Korenbloem 52, Uithoorn; Anne J. H. Boerboom, Abr. Durerstraat 25, II, Amsterdam, both of Netherlands

[21] Appl. No.: 838,175

[22] Filed: Sep. 30, 1977

[51] Int. Cl.[2] ........................ B01D 59/44; H01J 39/34

[52] U.S. Cl. .................................... 250/292; 250/290; 250/299

[58] Field of Search ............... 250/281, 282, 292, 296, 250/297, 298, 299, 396 R, 397, 290

[56] References Cited

U.S. PATENT DOCUMENTS

| | | | |
|---|---|---|---|
| 3,405,363 | 10/1968 | Brown | 250/396 |
| 3,524,056 | 8/1970 | Enge et al. | 250/299 |
| 4,066,895 | 1/1978 | Iwanaga | 250/296 |

FOREIGN PATENT DOCUMENTS

| | | | |
|---|---|---|---|
| 2539161 | 3/1977 | Fed. Rep. of Germany | 250/296 |

*Primary Examiner*—Bruce C. Anderson

*Attorney, Agent, or Firm*—Sughrue, Rothwell, Mion, Zinn and Macpeak

[57] ABSTRACT

A magnetic quadrupole lens 5 is disposed between an ion source 1 and a sector magnet 2 in a mass spectrometer, and an electric quadrupole lens 4 is disposed between the sector magnet and a detector 3. The powers and polarities of the lenses may be varied to provide a desired degree of dispersion of the ion streams and a desired focal plane orientation coincident with the detector face or plane.

7 Claims, 8 Drawing Figures

MASS SPECTROMETER

BACKGROUND OF THE INVENTION

This invention relates to a mass spectrometer including an ion source, a sector magnet, at least one detector, and both electric and magnetic quadrupole lenses.

In mass spectrometers the ion source generally produces a slightly divergent beam of ions having different masses but almost identical kinetic energy per ion charge by uniformly accelerating the ions in electric fields. The sector magnet produces a limited homogenous magnetic field which separates the ions according to their ratio of mass to charge (M/Q ratio) and focuses the ions of a certain M/Q ratio at one image point. The detector measures the intensity of the ion streams with a certain M/Q ratio at their focal or image points. In known single channel mass spectrometers, a single detector is used and the intensity of the magnetic field of the sector magnet is adjusted to the image point of a single stream of ions with a certain M/Q ratio. By changing the field intensity of the magnetic field of the sector magnet, the image points of the streams of ions with different M/Q ratios can be adjusted temporalily in succession on the detector and their intensity may be measured, but the ion streams which have not been so adjusted are lost for measurement purposes. To take a mass spectrum picture with such a prior art device is quite time consuming, and it can therefore only be used when the ion source operates constantly and the material source is sufficiently great. Quick phenomena which occur, for example, in a time period considerably less than a second, cannot be tracked or measured with such an instrument.

Since all ion streams with a certain M/Q ratio are focused simultaneously in the case of a constant magnetic field at corresponding spatially separate image points which together form a picture curve or plane, and the spreading of the image points of the various ion streams along the picture curve is called dispersion, multi-channel mass spectrometers are also known which have several detectors disposed on the picture curve. With such mass spectrometers it is possible to simultaneously measure the intensity of a number of ion streams with different M/Q ratios, corresponding to the number of detectors. It is also known to attach a detector at the place of the picture curve which is capable of simultaneously measuring all incident ion streams over a certain sector of the spectrum. For this purpose, photographic plates or channeltron honeycombs with suitable multi-channel detectors are used, and quick phenomena may also be recorded by such a photographic plate or the like. A mass spectrum cannot be directly registered in a computer memory, however, and a separate, second measuring process is required to evaluate the light absorption on the photographic plate, which is quite expensive. The photographic plate itself is also of significant size, which makes the mass spectrometer relatively bulky.

The deciding disadvantage of these known mass spectrometers is that the position of the picture curve and the dispersion are constant. Thus, fixedly adjusted detectors of a multi-channel spectrometer, for example, a mass spectrometer adjusted for a given isotrope frequency, may only be used for frequency measurements on a single element. Based on the invariable dispersion of known mass spectrometers, the isotope ions of another element with variable mass have other focal distances, so that the originally adjusted distances of the detectors must be mechanically realigned at considerable expense, if such alignment is possible. Moreover, only a certain range of the mass spectrum may be recorded by a multi-channel mass spectrometer, the terminal and starting masses of which range are at a certain fixed ratio. Larger or smaller parts of the spectrum cannot be recorded.

SUMMARY OF THE INVENTION

It is an object of the present invention to eliminate the inadequacies of the known mass spectrometers and to create a mass spectrometer in which the position of the picture curve and the dispersion may be changed in a simple manner over a wide range, independently of any mechanical adjusting processes.

According to the invention, electric and magnetic lenses of variable power are disposed between the ion source and the sector magnet and between the sector magnet and the detector. Specifically, a magnetic quadrupole lens is disposed between the ion source and the sector magnet and an electric quadrupole lens between the sector magnet and the detector. By the corresponding electrical adjustment of the lenses, both the dispersion, i.e., the distance between the image points of two masses in the focal plane, as well as the position of the focal plane in relation to the main plane of the system and its inclination relative to the main axis, can be continuously changed. As a result of such a change of dispersion it is possible to vary the distances of the isotope ions of a certain element and to synchronize them to the rigidly adjusted detectors by the electrical adjustment of the lenses, whereby any additional mechanical aligning process for the detectors is avoided in a transition to another element with a variable mass. The image sector of the spectrum may be increased or decreased for the simultaneous measurement of different parts of the spectrum.

Whenever the increase of the mass dispersion is greater than the increase of the picture of the inlet gap of the ion source, which is connected with a decrease of the aperture of the ion beam and thus of the image faults, it has been found experimentally that the dissolution capacity may be changed by a simple electrical shifting of the lenses over a large range, for example, from 200 to 2000. Beyond that, the transmission of the ion beams in the two planes of symmetry of the mass spectrometer standing vertically in relation to one another can be brought to an optimum by suitable adjustment of the lenses.

With the mass spectrometer according to the invention, measurements of relative intensity of two or more masses can be continuously measured electromagnetically and simultaneously without any mechanical adjustment, for example, with channeltron honeycomb detectors and OMA arrangements, whereby even the fastest phenomena can be recorded.

BROAD DESCRIPTION OF THE DRAWINGS

DETAILED DESCRIPTION OF THE PREFERRED EMBODIMENTS

Figure 1:
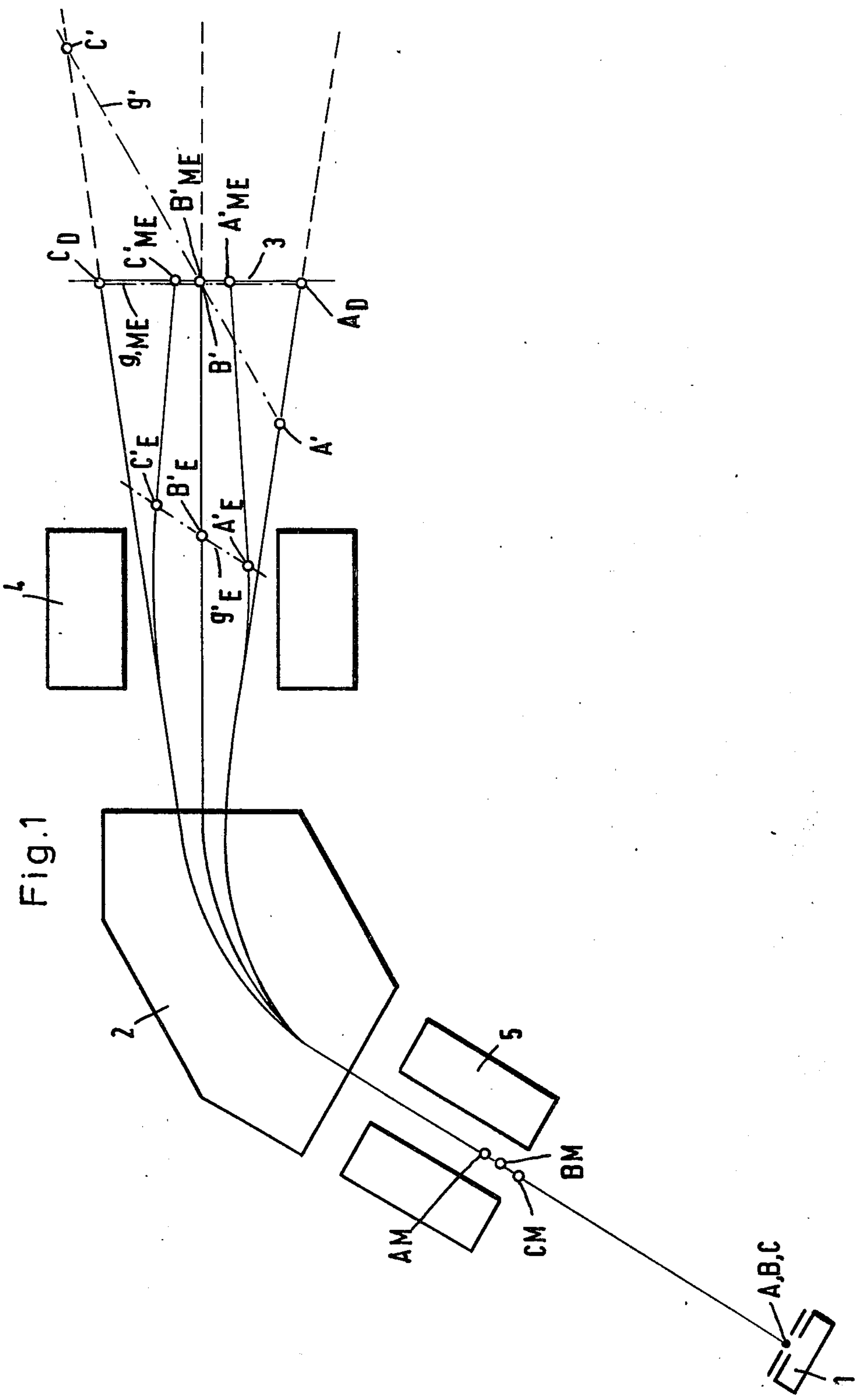
FIG. 1 shows a schematic diagram of a mass spectrometer according to the present invention.

Referring to FIG. 1, the mass spectrometer comprises an ion source 1, a sector magnet 2, a multichannel detector 3, a magnetic quadrupole lens 5 disposed between the ion source 1 and the sector magnet 2, and an electric quadrupole lens 4 disposed between the sector magnet 1 and the detector 3. The main beams of three streams of ions with variable masses $m_A$, $m_B$, $m_C$ are shown, whereby $m_A<m_B<m_C$. Whenever a standard mass spectrometer without the quadrupole lenses is used the ion streams project the inlet gap A, B, C of the ion source 1, which in this case is identical for all three ion streams, to the image points A', B' and C', which lie on the line g' in the focal plane.

The planar detector 3 is disposed at the point B' for simultaneously measuring ions of different masses, and its plane runs perpendicular to the main beam through B'. The ion streams focused at A' and B' produce blurred lines $A_D$ and $C_D$ on the detector. The degree of blurring depends on the opening angle of the optical ion system. By the introduction of the converging electric quadrupole lens 4 in the medium plane, the ion streams passing through A' and C' are deflected toward the optical axis. The image points A', B' and C' are thus shifted toward the image points $A_E'$, $B_E'$ and $C_E'$ lying on the straight focal line $g_E'$. This is followed by a blurring of all three ion beams in the detector 3, which may however be corrected by a virtual representation dependent on the mass of the inlet gap A, B, C.

This representation is brought about by the magnetic quadrupole lens 5 which has a divergent effect in the median plane. On the basis of the variable masses of the three ion streams, the results separate, virtual inlet gaps $A_M$, $B_M$ and $C_M$ for each ion stream which are disposed spacially one behind the other. This shifting of the inlet gap in dependence on the mass of the ions will shift the image points $A_E'$, $B_E'$ and $C_E'$ of the individual ion streams on the detector side of the sector magnet 2 to the image points $A_{ME}'$, $B_{ME}'$ and $C_{ME}'$ lying in the detector plane on the straight focal line $g_{ME}'$. It thus becomes clear that the spread of the image points $A_{ME}'$, $B_{ME}'$ and $C_{ME}'$ on the line $g_{ME}'$ is very much smaller than the spread of the image points A', B' and C' on the original focal line g', whereby the dispersion has considerably decreased by the electric quadrupole lens 4 and the magnetic quadrupole lens 5. In addition, the original focal plane or line g' has been rotated into the desired position $g_{ME}'$, coincident with the detector plane. By reversing the polarity of the voltages in the electric quadrupole lens 4 and of the magnets in the quadrupole lens 5, the dispersion may also be increased. In this case the electric quadrupole lens has a divergent effect, although the middle image point will still lie in the detector plane. Contrary to the case of decreasing the dispersion, in this case the focal plane will be rotated in the wrong direction. The opening angle of the ion streams decreases in inverse proportion to the image enlargement, however, so the rotation of the focal plane does not increase the fuzziness or blur.

Several and even better adjustments may be obtained by arranging an additional electric quadrupole lens (not shown) between the ion source and the sector magnet.

Figure 2:
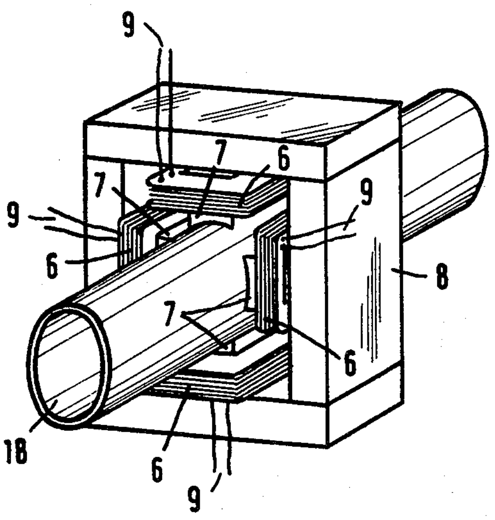
FIG. 2 shows a perspective view of an embodiment of the magnetic quadrupole lens.
Figure 3:
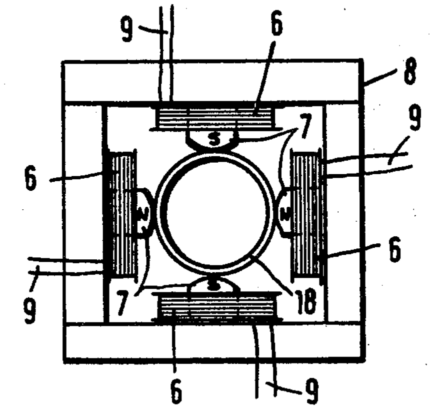
FIG. 3 shows a cross section through the magnetic quadrupole lens of FIG. 2.

In FIGS. 2 and 3 an embodiment of the magnetic quadrupole lens 5 is shown, which comprises four magnetic coils 6 disposed in a square, the poles 7 of which point inward and have a concave form, whereby like poles always lie opposite one another. In most cases a round or convex pole form will be satisfactory, as shown in FIG. 3, whereby a ratio $R_M=1.15\ R_A$ exists between the radius $R_M$ of the faces of the individual poles 7 and the radius $R_A$ of the cylinder 18 enclosed by the poles. The magnetic coils 6 have a common yoke 8, and are supplied via connecting lines 9.

Figure 4:
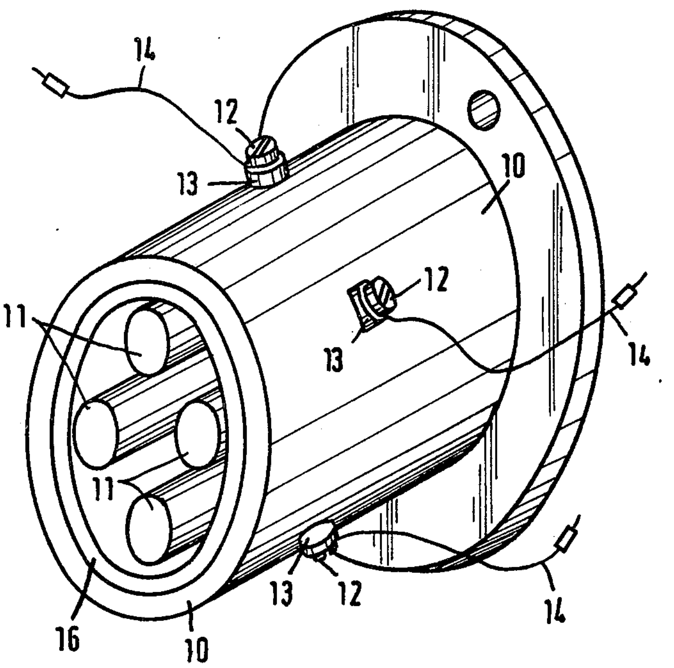
FIG. 4 shows a perspective view of an embodiment of the electric quadrupole lens.
Figure 5:
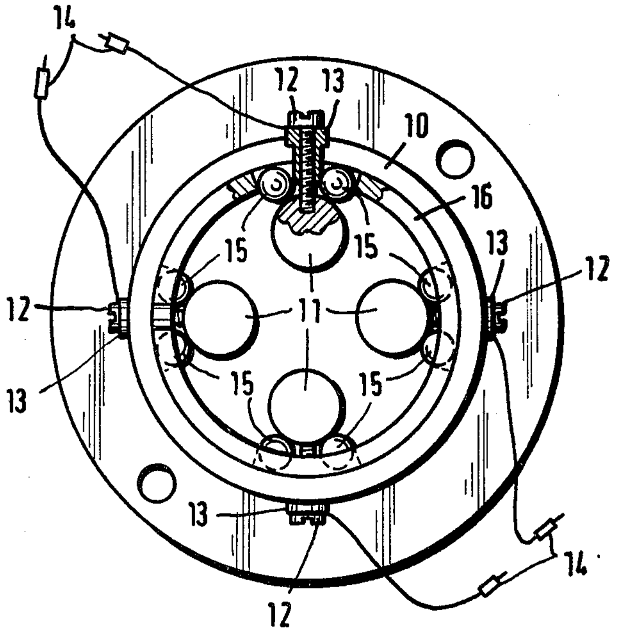
FIG. 5 shows a cross section of the electric quadrupole lens of FIG. 4.

In FIGS. 4 and 5 an embodiment of the electric quadrupole lens 4 is shown, which comprises a cylindrical housing 10 on the inside of which four pole bars 11 are symmetrically distributed over the cylinder jacket of the housing and extend in an axial direction. These pole bars are mounted by screws 12 guided within insulating rings 13, preferably made of $Al_2O_3$, through the housing wall and are connected to supply lines 14. For the precise positioning of the pole bars 11, balls 15, preferably of $Al_2O_3$, are provided and are mounted in a centering ring 16.

Figure 6:
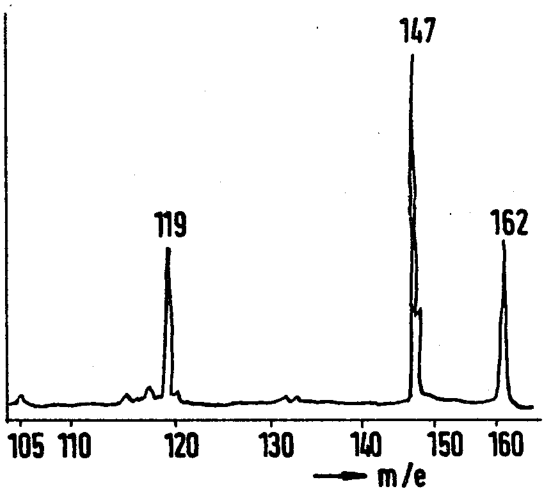
FIG. 6 shows part of the mass spectrum of 1,4-diisopropylbenzol with a mass dissolution capacity of 200 taken with the mass spectrometer of the invention.
Figure 7:
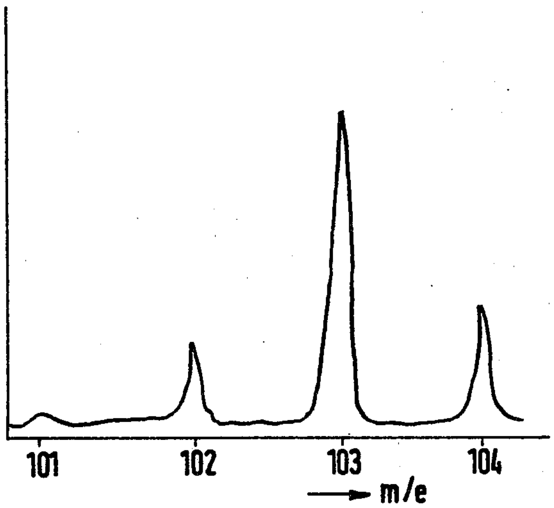
FIG. 7 shows part of the mass spectrum of 1,4-diisopropylbenzol with a mass dissolution capacity of 500, taken with the mass spectrometer of the invention.
Figure 8:
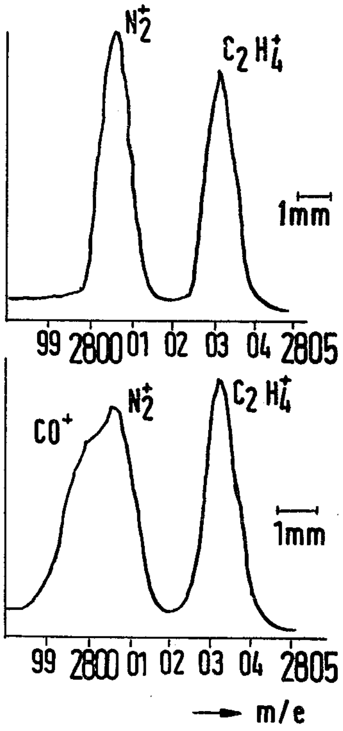
FIG. 8 shows part of the mass spectrum of $N_2^+$, $C_2H_4^+$ and $CO^+$ with a mass dissolution capacity of 2000, taken with the mass spectrometer of the invention.

The mass spectra shown in FIGS. 6 to 8 have been measured with the mass spectrometer of the invention.

FIG. 6 shows the mass spectrum of 1,4-diisopropylbenzol with the mass range m/e=105 to 162 ME with a mass dissolution capacity of 200. The electric quadrupole lens in this case was positive and the magnetic quadrupole lens negative in the median plane.

FIG. 7 shows a smaller sector, namely a mass range m/e=101-104 of the mass spectrum of 1,4-diisopropylbenzol with a dissolution capacity of 500. In this case, the polarities of the voltages and currents for the two lenses were reversed in relation to the measurement of the mass spectrum shown in FIG. 6, so that the electric quadrupole lens in the median plane was negative and the magnetic quadrupole lens positive.

In FIG. 8, the mass spectrum of $N_2^+$, $C_2H_4^+$ and $CO^+$ with an increased dissolution capacity of 2000 is shown. As compared to the measurement of the spectrum shown in FIG. 7, in this case the power of the lenses was increased and greater ion energies up to 2 keV were used.

What is claimed is:

1. A mass spectrometer capable of providing mass spectra measurements of short-lived phenomena comprising an ion source for producing a beam of ions of differing masses, a sector magnet, a planar detector, a variable power magnetic lens disposed between said ion source and said sector magnet for determining the dispersion of ions on said beam, and a variable power electrostatic lens disposed between said sector magnet and said detector, said electrostatic lens rotating the image curve of said ion beam to be parallel to and aligned with the plane of the detector wherein the image points corresponding to particles of different masses are simultaneously aligned with said plane of said detector.

2. The mass spectrometer of claim 1 further comprising a second electrostatic lens disposed between said ion source and said sector magnet.

3. The mass spectrometer of claim 1 wherein the lenses are cylindrical lenses.

4. The mass spectrometer of claim 1 wherein the lenses are quadrapole lenses.

5. A mass spectrometer capable of providing mass spectra measurements of short-lived phenomena comprising an ion source for producing a beam of ions of differing masses, a sector magnet, at least one planar detector, a variable power electrostatic lens disposed between said ion source and said sector magnet for determining the dispersion of ions in said beam, and a variable power magnetic lens disposed between said sector magnet and said detector, said magnetic lens rotating the image curve of said ion beam to be parallel and aligned with the plane of the detector wherein the image points corresponding to particles of different masses are simultaneously aligned with said plane of said detector.

6. The mass spectrometer of claim 5 wherein said lenses are cylindrical lenses.

7. The mass spectrometer of claim 6 wherein said lenses are quadrapole lenses.

* * * * *